US008485606B2

(12) United States Patent
Geisler et al.

(10) Patent No.: US 8,485,606 B2
(45) Date of Patent: Jul. 16, 2013

(54) LASER WELDED SEAT STRUCTURE

(75) Inventors: Axel Geisler, Burscheid (DE); Michael Hamers, Biedenkopf (DE); Andreas Schmitter, Wuppertal (DE)

(73) Assignee: Johnson Controls GmbH, Burscheid (DE)

( * ) Notice: Subject to any disclaimer, the term of this patent is extended or adjusted under 35 U.S.C. 154(b) by 821 days.

(21) Appl. No.: 11/664,930

(22) PCT Filed: Oct. 5, 2005

(86) PCT No.: PCT/EP2005/055022
§ 371 (c)(1),
(2), (4) Date: Nov. 19, 2008

(87) PCT Pub. No.: WO2006/040282
PCT Pub. Date: Apr. 20, 2006

(65) Prior Publication Data
US 2009/0072601 A1 Mar. 19, 2009

(30) Foreign Application Priority Data

Oct. 8, 2004 (DE) .......................... 10 2004 049 359

(51) Int. Cl.
*A47C 7/02* (2006.01)
*B60N 2/42* (2006.01)

(52) U.S. Cl.
USPC ............... 297/452.18; 297/216.13; 297/463.2

(58) Field of Classification Search
USPC .................. 297/452.18, 452.2, 216.13, 463.2
See application file for complete search history.

(56) References Cited

U.S. PATENT DOCUMENTS

| 6,308,882 | B1 * | 10/2001 | Shuster et al. ................ 228/175 |
| 6,670,573 | B2 * | 12/2003 | Klein et al. .............. 219/121.64 |
| 6,739,673 | B2 * | 5/2004 | Gupta et al. ............. 297/452.65 |
| 6,799,806 | B2 * | 10/2004 | Eppert et al. ............... 297/463.1 |
| 7,066,552 | B2 * | 6/2006 | Yoshida .................... 297/452.18 |
| 7,802,852 | B2 * | 9/2010 | Siegrist et al. ........... 297/452.18 |
| 7,820,939 | B2 * | 10/2010 | Mazumder et al. ...... 219/121.64 |
| 2003/0080599 | A1 * | 5/2003 | Hohn et al. .................... 297/362 |
| 2004/0113481 | A1 * | 6/2004 | Saberan et al. .......... 297/452.18 |

FOREIGN PATENT DOCUMENTS

| DE | 199 33 895 C2 | 1/2001 |
| DE | 199 43 752 C1 | 5/2001 |
| DE | 100 39 070 A1 | 2/2002 |
| DE | 101 10 529 A1 | 9/2002 |
| DE | 102 06 887 B4 | 9/2003 |

(Continued)

OTHER PUBLICATIONS

EP1136315, Sep. 2001, Klooss Peter, Description—machine translation (Espacenet).*

(Continued)

*Primary Examiner* — David Dunn
*Assistant Examiner* — Tania Abraham
(74) *Attorney, Agent, or Firm* — Foley & Lardner LLP

(57) ABSTRACT

A seat structure includes a frame having a plurality of parts having respective joining surfaces. Two respective joining surfaces, which belong to two respective different parts, are joined to one another by laser-welding. A method of forming a seat frame having a plurality of parts includes the steps of positioning the parts in a fixture, fixing the position of the parts relative to one another and laser-welding the parts to form the seat frame.

15 Claims, 3 Drawing Sheets

FOREIGN PATENT DOCUMENTS

| | | |
|---|---|---|
| EP | 1 136 315 A1 | 9/2001 |
| EP | 1 180 410 B1 | 2/2002 |
| EP | 1 225 000 A1 | 7/2002 |
| EP | 1 154 875 B1 | 2/2004 |
| JP | 58-159990 A | 9/1983 |
| JP | 2165873 | 6/1990 |
| JP | 05-154677 A | 6/1993 |
| JP | 11-156574 A | 6/1999 |
| JP | 2001-045634 A | 2/2001 |
| JP | 2001-519281 A | 10/2001 |
| JP | 2002-307185 A | 10/2002 |
| JP | 2003-517934 A | 6/2003 |
| JP | 2004-263866 A | 9/2004 |
| WO | WO 99/19164 | 4/1999 |

OTHER PUBLICATIONS

International Search Report for PCT/EP2005/055022, date of mailing Jan. 19, 2006, 3 pages.

English translation of Notice of Reasons for Rejection dated May 11, 2010 as received in corresponding Japanese Application No. JP 2007-535167, 2 pages.

Japanese "Questioning" Action dated Jan. 17, 2012 as received in corresponding Japanese Application No. JP 2007-535167 (Appeal No. JP2011-009827) and its English translation thereof, 8 pages.

* cited by examiner

LASER WELDED SEAT STRUCTURE

The present invention relates to a frame of a seat, especially of a front seat of a motor vehicle, which consists of a plurality of parts, which have respective joining surfaces. The present invention also relates to a method for producing a frame of a seat and to a recliner and to a method for positively joining two parts and a part which is especially suited to laser-welding.

Frames of seats, especially of front seats of motor vehicles, generally consist of a plurality of parts which, according to the prior art, are joined to one another by means of protective gas welding, for example. This method is, however, relatively complicated as, frequently, the parts for welding generally have to be repeatedly clamped and/or their position has to be repeatedly altered which is time-consuming and therefore cost-intensive. Moreover, protective gas welding is a relatively slow method per se.

It was, therefore, the object of the present invention to provide a frame of a seat which does not have the drawbacks of the prior art.

The object is achieved by a frame of a seat, especially of a front seat of a motor vehicle, which consists of a plurality of parts, which have respective joining surfaces in which two respective joining surfaces, which belong to two respective different parts, are positively joined to one another by laser-welding.

It was extremely surprising and unexpected for the person skilled in the art that the frame according to the invention is able to be made by using a single clamping action. The position of the parts does not have to be altered during the welding. The frame according to the invention may be produced easily and cost-effectively.

According to the invention, the frame consists of a plurality of parts which have joining surfaces which are joined to one another by laser-welding.

During laser-welding, a laser beam is focused onto the tools to be welded and heats the welding point up to the welding temperature, at which the material of at least one of the two parts to be welded becomes fluid. During setting, the two parts are joined to one another. Both solid state lasers and gas lasers are able to be used. Normal output is between 2 and 60 kW. Optionally, the laser-welding is carried out under protective gas. Preferably the laser oscillates during the welding, so that a straight welded seam is not produced but a welded seam which oscillates about a straight line. Longer welded seams result therefrom and/or the fused region becomes wider.

According to the invention, the joining surfaces of two parts are joined to one another by laser-welding. These joining surfaces are preferably designed with tolerances such that a join may be produced which is almost free of gaps. It is particularly preferred, therefore, that the joining surfaces are flat.

In a further preferred embodiment, the parts in the region of the joining surfaces comprise means which fix the position of the respective parts relative to one another, so that the parts are able to be put into a clamping device, clamped against one another and then welded. The means, therefore, have to be designed such that, when put into the clamping device but ultimately when clamped, the parts adopt a predetermined position relative to one another, and do not slip when clamped and/or when laser-welded. These means may be any means which are familiar to the person skilled in the art, positive and/or non-positive connections, such as for example abutting surfaces. By these means and by the cooperation of the joining surfaces, the position of the respective parts to be joined together is fixed relative to one another in all spatial directions, so that a product results with relatively low manufacturing tolerances. By the cooperation of the joining surfaces and/or the means, all parts required for the partial frame may be positioned in a clamping device, for example, and clamped to one another, without said parts slipping. The laser-welding may then be carried out in a single clamping action.

A further subject of the present invention is a method for producing a frame of a seat, especially of a front seat, which consists of a plurality of parts in which the position of the parts relative to one another is fixed in a clamp and the parts are laser-welded to one another. The method according to the invention may be carried out easily and cost-effectively. It was extremely surprising and unexpected for the person skilled in the art that the frame of a seat may be produced in a single clamping action, with the method according to the invention.

A clamp in the sense of the invention is a device into which the parts of the frame are put, fixed in their position relative to one another, optionally aligned and then clamped against one another.

Preferably the joining surfaces are designed and/or clamped to one another such that they are positioned on one another, at least almost without gaps, and may be welded together.

Preferably, with the method according to the invention, the parts to be joined are brought into engagement by means which fix the position of the parts relative to one another at least in two spatial dimensions.

A further subject of the present invention is a recliner for adjusting the position of a backrest of a seat, with a recliner center region and adapter plates in which the adaptor plates are respectively joined by at least one laser-welded seam to the recliner center region.

The recliner according to the invention may be produced easily and cost-effectively as the position thereof does not have to be altered during welding. The welded seams are, therefore, so stable that they are sufficient for the high strength requirements of the recliner, even during an accident.

Preferably the welded seams are of circular design.

It is further preferred that the recliner is preferably positively joined to the backrest of a seat, especially of a motor vehicle. It is particularly preferred that the positive material connection is a laser-welded seam.

A further subject of the present invention is a part, for example the part of a seat, especially the backrest of a motor vehicle seat which is arranged in the frontmost row of the automobile (driver seat and/or passenger seat). According to the invention, this part has a tab which may be plastically deformed and which may be laser-welded to a further part. The part according to the invention allows the very simple, stable joining of two parts which are initially joined together and in which the tab is then pressed down by holding-down devices, for example, and welded to the other part.

A further subject of the present invention is, therefore, a method for positively joining two parts in which a tab, which is arranged on the first part, is bent in the direction of the second part after joining together the two parts and is then laser-welded thereto.

The invention is described hereinafter with reference to FIGS. 1-3.

These explanations are given merely by way of example and do not restrict the general inventive idea. The explanations similarly apply to all subjects of the present invention.

Figure 1:
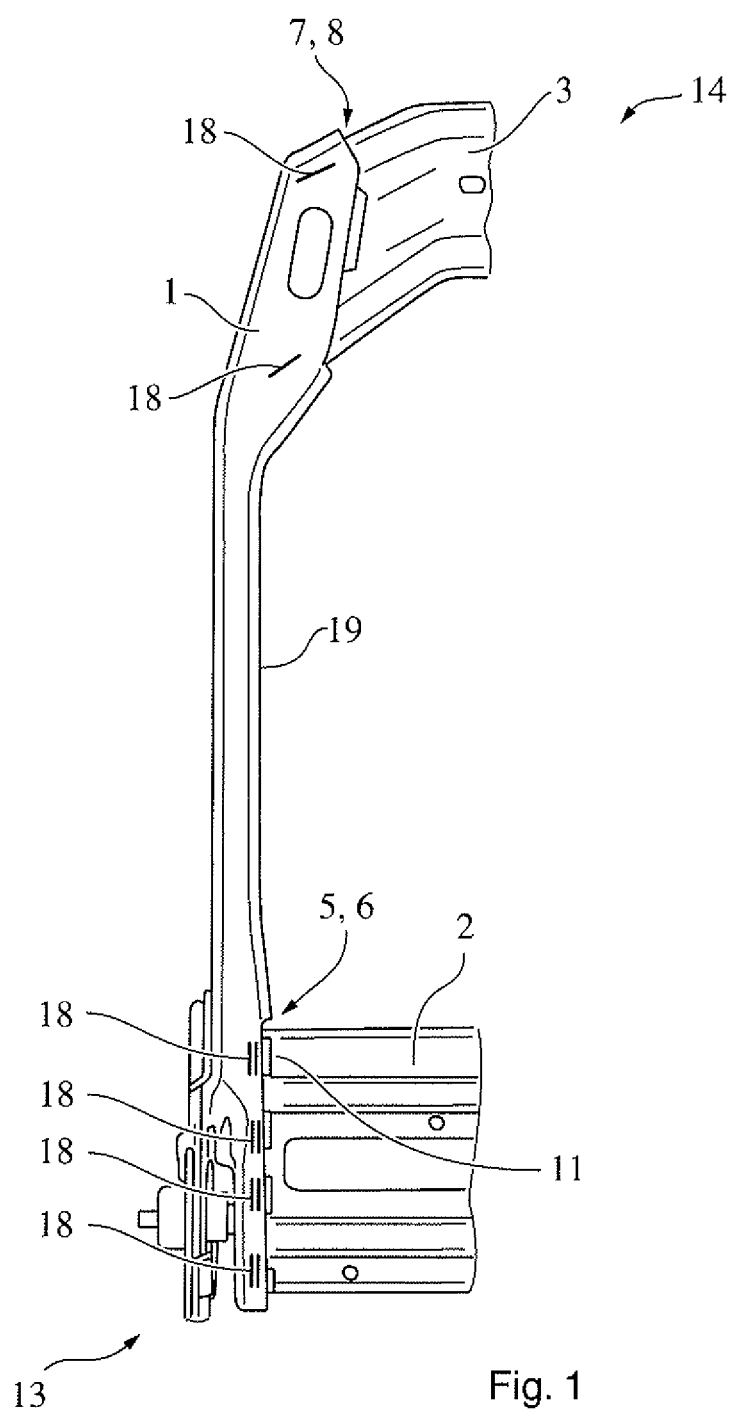
FIG. 1 shows a part of the frame according to the invention.

A part of the frame according to the invention is shown in FIG. 1 which consists of four parts 1-4, only three parts 1, 2, 3 being shown. The parts are pressed parts which all have a material thickness of 0.9 mm. The parts are put into a clamp, such that the joining surfaces 5, 6 of the parts 1 and 2 and the joining surfaces 7, 8 of the parts 1 and 3 are superimposed on one another, if possible without gaps. In order to design the joining surfaces as optimally as possible as regards welding techniques, the side part 1, especially in the joining region 5, 6 is of very rigid design, whilst the cross member 2 is of flexible construction. Accordingly, the parts are clamped against one another in order to minimize gaps which are still present. The joining surfaces are joined to one another by welded seams 18 which are parallel in the present case. The person skilled in the art recognizes that the welded seams may also have a different shape. For example, circular welded seams are a preferred embodiment. The tolerances of the joining surfaces are designed such that the two surfaces lie flat on top of one another and have no gap relative to one another.

Furthermore, the cross member 2 has means 11, for example a plurality of embossments, which clearly define the position of the parts relative to one another, so that when clamped, which is carried out before welding, the gap between the parts is able to be minimized. As a result, the parts have a low tolerance relative to flatness and angularity. The person skilled in the art recognizes that such means may also be present on the parts 1 and/or on the parts 3.

The contour 19 may be of any design, according to the wishes of the customer, and may be adapted to components, for example airbags, which are arranged in the seat region.

Figure 2:
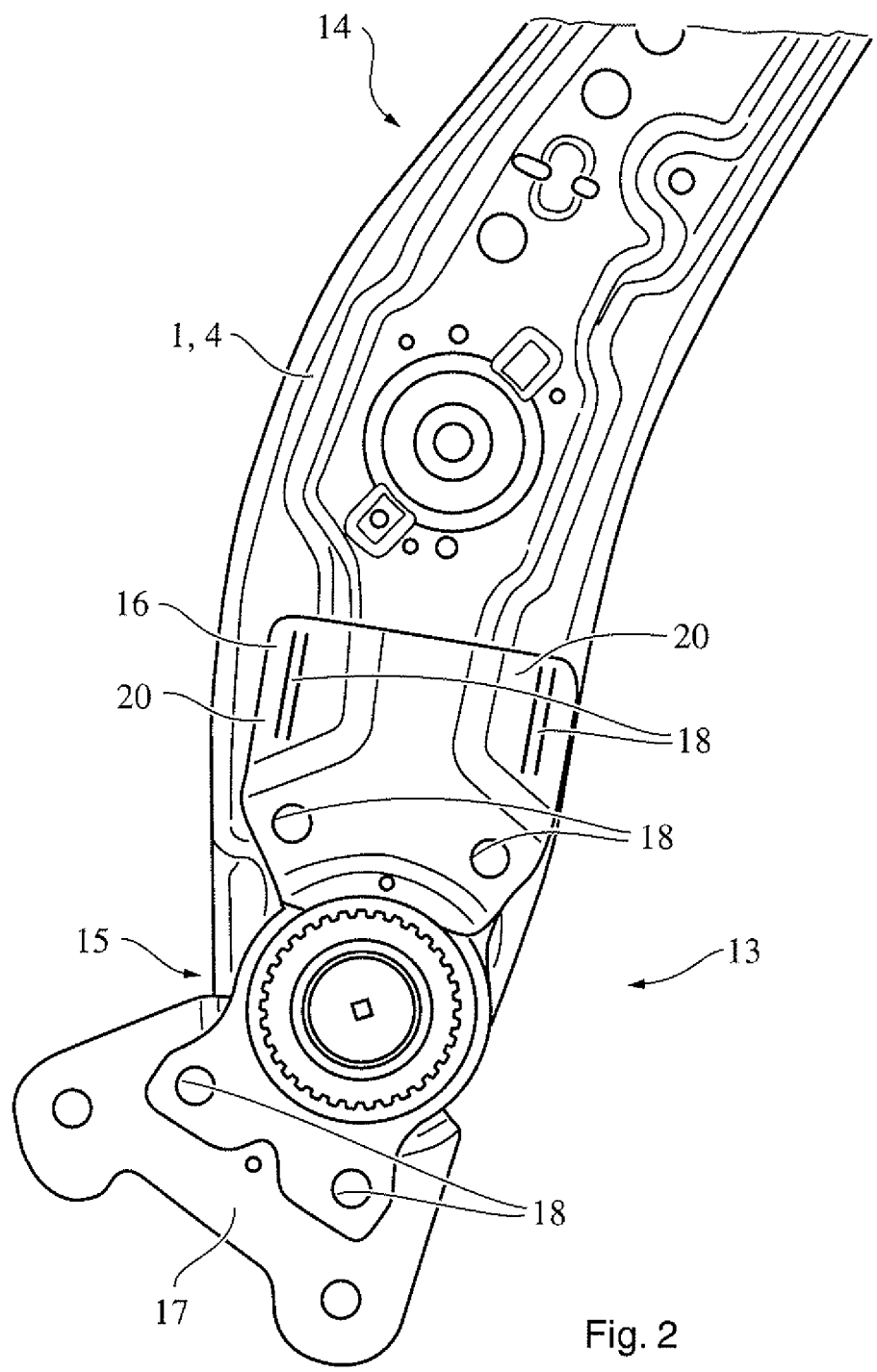
FIG. 2 shows the recliner according to the invention.

FIG. 2 shows a recliner 13 which has a so-called recliner center region 15 which contains a means with which the position of the backrest may be altered relative to the seat surface. Adapters 16, 17 are positively arranged on the recliner, the positive material connection being carried out according to the invention in the present case by laser-welding. These welded seams 18 are circular in the present example. As a result, it is possible that all parts to be joined, i.e. the recliner center region 15 as well as the adapter 16, may be put into a shape and clamped to one another and welded, thus without the position of the recliner having to be altered and/or without requiring a plurality of clamps.

The recliner according to the invention is arranged with the laser-welded seams 18 which are parallel in the present case, on a part of the frame 1, 4 of the backrest 14. The surface 20 inside the side part 1 which is welded to the adapter 16, is designed such that a plurality of adapters may be joined thereto. For example, the surface 20 is designed to be as flat as possible. The adapters 16, 17 may have a variable material thickness, but may be welded with the same laser to other components, which considerably simplifies the production. This may be carried out with an infinitely adjustable laser.

Figure 3:
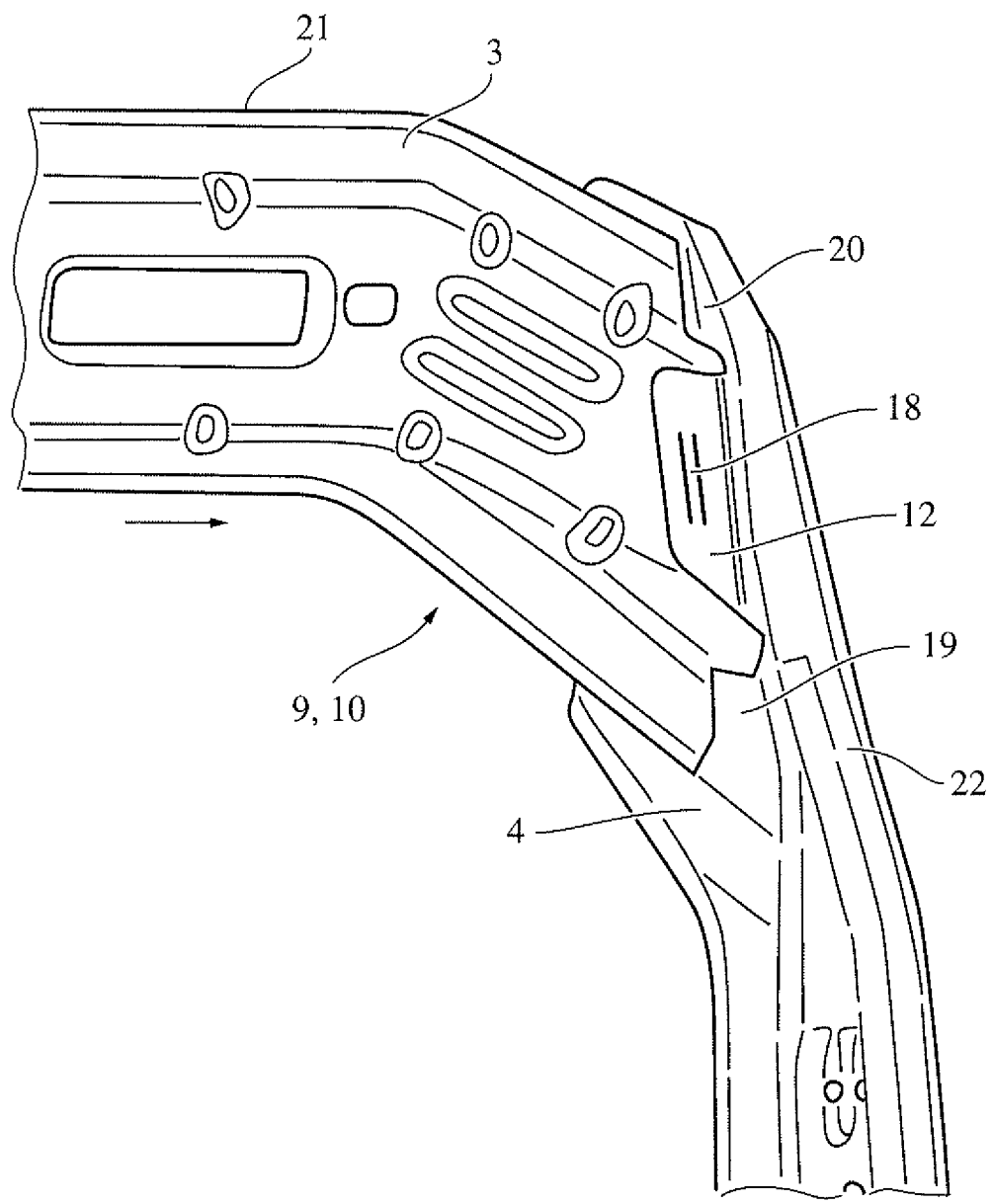
FIG. 3 shows the part according to the invention with a tab.

FIG. 3 shows the part 4 according to the invention with the tab 12. The cross member 3 which is arranged in the head support region of the motor vehicle seat is bent back in the edge region 21 in order to increase the rigidity of the frame and to reduce the risk of injury. The parts 3 and 4 are, as shown by the arrow, joined together and clamped to one another and positioned relative to one another by the corresponding device in a corresponding position. Then the tab 12 is folded down until it rests without gaps on the part 3. This pressing down may, for example, be carried out by holding-down devices. Then the part 3 and the tab 12 are positively joined to one another by laser-welding by means of two laser-welded seams 18 in any arrangement. By means of the arrangement which is parallel relative to the paper plane of the surfaces to be welded, a simple join is possible. This is also necessary for minimizing the tolerances of the components relative to one another. The geometry 22 of the part 4 allows a good flux of force in the entire system. The join between the parts has a high degree of flatness and low tolerances.

The person skilled in the art understands that the welded seams 18 do not have to be parallel and that optionally even one welded seam is sufficient. Also the round welded seam of the recliner may have a different shape.

It may be seen from all figures that the parts 1, 2, 3 are nested in one another and the joins are designed such that good force transmission is possible between the components.

List of Reference Numerals 1-4 Parts of the frame of the backrest of a front seat
5-10 Joining surfaces
11 Means for defining the position of the parts 1-4 relative to one another, embossments
12, 19, 20 Means for defining the position of the parts 1-4 relative to one another
13 Recliner
14 Backrest
15 Recliner center region
16, 17 Adapter plates
18 Laser-welded seam
19 Contour
20 Joining surface
21 Edge
22 External geometry of the side part 1, 4

The invention claimed is:

1. A vehicle seat frame comprising:
a plurality of parts having respective joining surfaces, the plurality of parts including at least one side part and at least one cross member, the at least one side part having a first flat joining surface and the at least one cross member having a corresponding second flat joining surface, wherein the first flat joining surface has a relatively rigid construction relative to the second flat joining surface, and the second flat joining surface has a relatively flexible construction relative to the first flat joining surface; and
a positioning device provided on at least one of the at least one side part and the at least one cross member in a region of the first flat joining surface and the second flat joining surface, the positioning device being configured to fix a position of the at least one side part and the at least one cross member relative to one another in multiple directions,
wherein the relatively rigid construction of the first flat joining surface and the relatively flexible construction of the second flat joining surface allow for an assembly between the first flat joining surface and the second flat joining surface that is substantially without gaps,
wherein after the assembly is provided, the first flat joining surface and the second flat joining surface are configured to be joined to one another by laser-welding;
wherein the at least one side part comprises a first side part and a second side part that is spaced apart from the first side part;
wherein the at least one cross member comprises an upper cross member and a lower cross member, and wherein the upper cross member and the lower cross member extend between the first side part and the second side part;
wherein the positioning device comprises a first deformable tab on the first side part and a second deformable tab on the second side part, the first deformable tab and the second deformable tab being configured to engage the upper cross member.

2. The seat frame of claim 1 wherein the positioning device is configured to fix the position of the at least one side part and the at least one cross member relative to one another in all spatial directions.

3. The seat frame of claim 1 wherein the positions of the parts are configured to be fixed to one another in a fixture.

4. The seat frame of claim 3 wherein the laser-welding of the parts is carried out in the fixture.

5. The seat frame of claim 1 wherein the positioning device comprises a plurality of embossments on the at least one cross member. positively joined to one another by laser-welding.

6. The seat frame of claim 1 wherein the parts have a material thickness that is approximately 0.9 millimeters.

7. The seat frame of claim 1 wherein the parts are positively joined together by a weld seam that is substantially circular in shape.

8. A vehicle seat frame comprising:
a plurality of parts having respective joining surfaces, the plurality of parts including at least one side part and at least one cross member, the at least one side part having a first flat joining surface and the at least one cross member having a corresponding second flat joining surface, wherein the first flat joining surface has a relatively rigid construction relative to the second flat joining surface, and the second flat joining surface has a relatively flexible construction relative to the first flat joining surface; and
a positioning device provided on at least one of the at least one side part and the at least one cross member in a region of the first flat joining surface and the second flat joining surface, the positioning device being configured to fix a position of the at least one side part and the at least one cross member relative to one another in multiple directions,
wherein the relatively rigid construction of the first flat joining surface and the relatively flexible construction of the second flat joining surface allow for an assembly between the first flat joining surface and the second flat joining surface that is substantially without gaps,
wherein after the assembly is provided, the first flat joining surface and the second flat joining surface are configured to be joined to one another by laser-welding;
wherein the at least one side part comprises a first side part and a second side part that is spaced apart from the first side part;
wherein the at least one cross member comprises an upper cross member and a lower cross member, and wherein the upper cross member and the lower cross member extend between the first side part and the second side part;
wherein the positioning device comprises a plurality of embossments on the lower cross member that are configured to engage the first side part and the second side part.

9. The seat frame of claim 8 wherein the positioning device comprises a deformable tab on the at least one side part.

10. The seat frame of claim 9 wherein the deformable tab is configured to be bent towards and engage the at least one cross member before the parts are positively joined to one another by laser-welding.

11. The seat frame of claim 8 wherein the positions of the parts are configured to be fixed to one another in a fixture.

12. The seat frame of claim 11 wherein the laser-welding of the parts is carried out in the fixture.

13. A vehicle seat frame comprising:
a plurality of parts having respective joining surfaces, the plurality of parts including at least one side part and at least one cross member, the at least one side part having a first flat joining surface and the at least one cross member having a corresponding second flat joining surface, wherein the first flat joining surface has a relatively rigid construction relative to the second flat joining surface, and the second flat joining surface has a relatively flexible construction relative to the first flat joining surface; and
a positioning device provided on at least one of the at least one side part and the at least one cross member in a region of the first flat joining surface and the second flat joining surface, the positioning device being configured to fix a position of the at least one side part and the at least one cross member relative to one another in multiple directions;
wherein the relatively rigid construction of the first flat joining surface and the relatively flexible construction of the second flat joining surface allow for an assembly between the first flat joining surface and the second flat joining surface that is substantially without gaps,
wherein after the assembly is provided, the first flat joining surface and the second flat joining surface are configured to be joined to one another by laser-welding;
wherein the at least one side part comprises a first side part and a second side part that is spaced apart from the first side part;
wherein the at least one cross member comprises an upper cross member and a lower cross member, and wherein the upper cross member and the lower cross member extend between the first side part and the second side part;
wherein the positioning device comprises:
a first deformable tab on the first side part and a second deformable tab on the second side part, the first deformable tab and the second deformable tab being configured to engage the upper cross member; and
a plurality of embossments on the lower cross member that are configured to engage the first side part and the second side part.

14. The seat frame of claim 13 wherein the positions of the parts are configured to be fixed to one another in a fixture.

15. The seat frame of claim 14 wherein the laser-welding of the parts is carried out in the fixture.

* * * * *